United States Patent [19]

Sohm

[11] 3,989,930

[45] Nov. 2, 1976

[54] MULTI-MODE BILLING SYSTEM CONTROLLED BY COPY SIZE AND DOCUMENT ORIGINAL SIZE

[75] Inventor: Lawrence R. Sohm, Fairport, N.Y.

[73] Assignee: Xerox Corporation, Stamford, Conn.

[22] Filed: Mar. 27, 1975

[21] Appl. No.: 562,536

Related U.S. Application Data

[63] Continuation of Ser. No. 393,545, Aug. 31, 1973, abandoned.

[52] U.S. Cl. ........................ 235/92 SB; 235/92 AC; 235/92 R; 355/14

[51] Int. Cl.[2] ........................................ G03B 27/06

[58] Field of Search .................... 235/92 SB, 92 AC; 355/14; 235/98 B

[56] References Cited

UNITED STATES PATENTS

| | | | |
|---|---|---|---|
| 548,243 | 10/1895 | Wood | 235/92 PK |
| 588,797 | 8/1897 | Kraft | 235/92 PK |
| 3,290,489 | 12/1966 | Auer | 235/92 TC |
| 3,317,132 | 5/1967 | Martin | 235/92 QC |
| 3,358,570 | 12/1967 | Morrill | 235/92 SB |
| 3,549,870 | 12/1970 | Lay | 235/92 GC |
| 3,551,652 | 12/1970 | Faude | 235/92 CT |
| 3,601,585 | 8/1971 | Paulsen | 235/92 DN |
| 3,655,281 | 4/1972 | Warren | 235/98 B |
| 3,729,129 | 4/1973 | Fletcher | 235/92 EA |

*Primary Examiner*—Joseph M. Thesz

[57] ABSTRACT

In a billing apparatus of a copier/duplicator machine, a plurality of counters are provided for recording the numbers of the copies made by different counters according to the size of the copies.

9 Claims, 2 Drawing Figures

MULTI-MODE BILLING SYSTEM CONTROLLED BY COPY SIZE AND DOCUMENT ORIGINAL SIZE

FIELD OF THE INVENTION

This invention relates to a billing apparatus in a copier/duplicator machine and, more particularly, to an improved billing apparatus having a plurality of counters for recording the number of copies according to the size of the copies.

BACKGROUND OF THE INVENTION

The present day copier/duplicator machines are typically provided with suitable billing apparatus having a counter for indicating the number of copies made for billing purposes. With the advent of more sophisticated and refined copier/duplicator machines there have been a number of variations to the billing scheme and accordingly to the scheme of counting the copies. One such variation has been disclosed in the U.S. patent application Ser. No. 344,321, filed Mar. 23, 1973, now abandoned and refiled as U.S. application Ser. No. 548,037 filed Feb. 7, 1975, and assigned to the present assignee. According to the copending application, there is provided a programmable billing apparatus having a first counter for recording the total count of copies made on a cummulative basis and a second counter for recording on a cummulative basis the total count of the copies made up to a first break point, that is, for example, up to copies 1 through 9 in a copy run and a third counter for recording on a cummulative basis the total number of copies made in a copy run from the first break point and up, for example, copies 10 through 20, where the break points of the second and third counters are programmable to change the cummulative count recorded thereon. Heretofore, the billing apparatus has been generally designed to register the number of copies made and record each occurrence of copying cycle as one copy count without regard to the size of the copy papers used.

As described in pending U.S. patent application, Ser. No. 284,687, filed on Aug. 29, 1972, now abandoned and refiled as U.S. application Ser. No. 367,996, filed June 7, 1973, now U.S. Pat. No. 3,900,258 or in a U.S. patent application, Ser. No. 393,546 filed on Aug. 3, 1973 now abandoned in favor of U.S. application Ser. No. 528,163, filed as a continuation on Nov. 11, 1974, recently a copier/duplicator machine has been developed to operate in different modes for making of copies of substantially different sizes.

SUMMARY OF THE INVENTION

It is an object of the present invention to provide an improved billing apparatus.

It is another object of the present invention to provide a billing apparatus for giving separate record of counts for different sizes of copies.

It is still another object of the present invention to provide billing apparatus for operation in a copier/duplicator machine having different modes of operation wherein different size document originals are copied in different size copy sheets in different modes of operation.

These and other objects of the present invention are achieved according to the present invention by a billing apparatus having counters for recording on a cummulative basis the number of the copies made up to a certain size and another counter for indicating the number of copies made on another size larger than said certain size.

The foregoing and other objects and features of the present invention will become clearer from the following detailed description of an illustrative embodiment of the present invention in conjunction with the accompanying drawings in which.

DETAILED DESCRIPTION

Briefly stated, the present billing apparatus may be used in conjunction with a copier/duplicator machine designed to make copies of different sizes, such as the one disclosed in the above-mentioned pending application, Ser. No. 284,687. Such a machine is designed to operate in two different modes: where in a first or base mode of operation, the machine is conditioned so that its optical scanning mechanism scans across a stationary document original to form a latent electrostatic image on a photosensitive plate for subsequent development and transfer to a copy sheet. In a second or large document copying (hereinafter referred to also as LDC mode), the optical scanning mechanism is held in a stationary position while the document original is moved past a scanning station of machine to form a latent image of the document original on the photosensitive plate for subsequent development. Advantageously, the machine is designed so that, in its base made, it can be made copies up to a predetermined size, for example, up to 8½ inches × 14 inches size paper and, in its LDC mode, it can make copies of sizes exceeding this predetermined size.

As illustrated and described in detail in the copending application, Ser. No. 344,321, mentioned above, the copier/duplicator apparatus of the foregoing description may be provided with a billing apparatus having a first counter for recording on a cummulative basis the total number of copies that have actually been made and a second counter for recording cummulatively the number of copies made up to a first break point, for example, the number of copies made up to nine copies per copy run and a third counter for recording cummulatively the number of copies made from the first break point to a second break point, for example, from the tenth to the twentieth copies made in a single copy run. The billing apparatus, however, does not provide means for discriminating the copy count in terms of the size of the copy sheet. In accordance with the present invention, a suitable circuitry is provided for cummulatively counting and recording the number of the copies made on different counters according to the size of the copy sheets.

Figure 1:
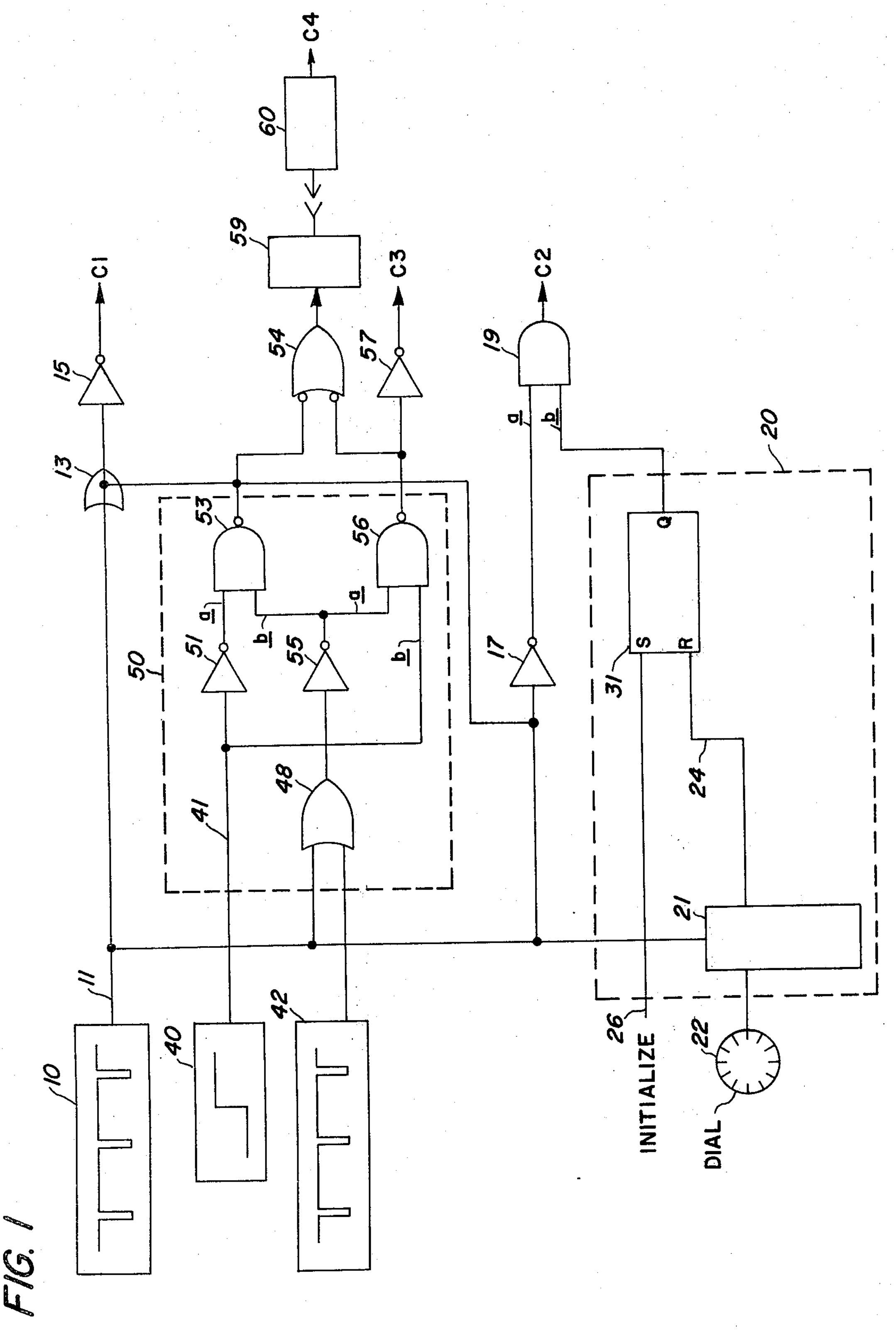
FIG. 1 shows a schematic circuit diagram of a billing apparatus according to the present invention.

More specifically, referring to FIG. 1, the billing apparatus of the type disclosed in the above-mentioned pending application Ser. No. 344,321, includes a first counter C1 that records cummulatively the total number of copy count pulses generated by a suitable pulse generating means 10 of the machine logic. The copy count pulses represent the number of copies made and are applied to counter C1 via a suitable path 11 that may include a wired OR gate 13 and an inverting gate 15. Such apparatus is also provided with one or more additional counters for recording, on a cummulative basis, the copy counts up to corresponding break points. Such an additional counter may include a counter C2 of a suitable design for recording the count pulses representing the copy counts up to the first break point as applied thereto from the pulse generating means 10 via an inverting gate 17 and an AND gate 19. As described in the pending application, the second counter C2 is designed to count up to the first break point, for example, up to the first nine copies, under the control of suitable programmable logic 21. As described in detail in the above-mentioned pending application, the programmable logic 21 is designed so that, when the copy count pulses from the means 10 matches the number of the count set by a dial 22 and stored therein, it provides logical 1 via its output path 24 to reset latch circuit 31.

Backtracking a little, the latch circuit 31 has a logical 1 applied to its set lead S via a path 26 during the initializing operation of the machine logic. When latch circuit 31 is initialized and set by the initializing signal, it provides a logical 1 at its output Q. This takes place when the machine logic is initialized for the purpose of making copies, at the start of a copy run. The logical 1 output from Q is in turn applied to the second input *b* of the AND gate 19 to enable this gate to apply the copy count pulses from the means 10 to the second counter C2. The latch circuit 31 is reset by the output of the programmable logic 21 where the copy count pulse count reaches the output Q of the breakpoint. In response, the latch circuit changes from a logical 1 to a logical 0 and disables the gate 19 to thereby stop the second counter C2. In the foregoing manner, the counters C1 and C2 are used to record the number of copies made without regard to the size of the copies made. However, the billing apparatus according to the prior art does not provide means for differentiating or discriminating the count according to the size of the copies made.

In accordance with the present invention, an additional counter C3 is provided in the billing apparatus for recording the number of copies made in copy sheets of sizes different from those of the copies recorded by the counters C1 and C2 and means for assuring that the copy count pulses are channeled to proper ones of the counters C1, C2 and C3 according to the sizes of the copies being made. More specifically, the billing counters C1 and C2 are used to record the number of copies made up to a certain predetermined size (e.g., legal size), the counter C3 is used to record the number of copies where the copy size exceeds the certain predetermined size while means 50 is provided for channeling the count pulses to proper one of the counter, C1 and C2 or C3 depending upon the size copies be produced. As illustrated in, FIG. 1, the count pulse channeling means 50 may comprise a plurality of gating means 48, 51, 53, 55 and 56 for gating copy count pulses from a copy count pulse generating means 42 of a copier/duplicator operating an LDC mode to either the counters C1 and C2 or the counter C3 under the control of the copy size indicating means 40.

The copy size sensing means 40 may take the form of any suitable circuit which provides a logical 0 signal representing a copy sheet size of up to a given dimension, for example, up to a legal size sheet, regardless of whether or not the machine operates in the base or LDC mode and a logical 1 signal if the machine is set to make copies larger than the given dimension, for example 18 inches × 14 inches.

Figure 2:
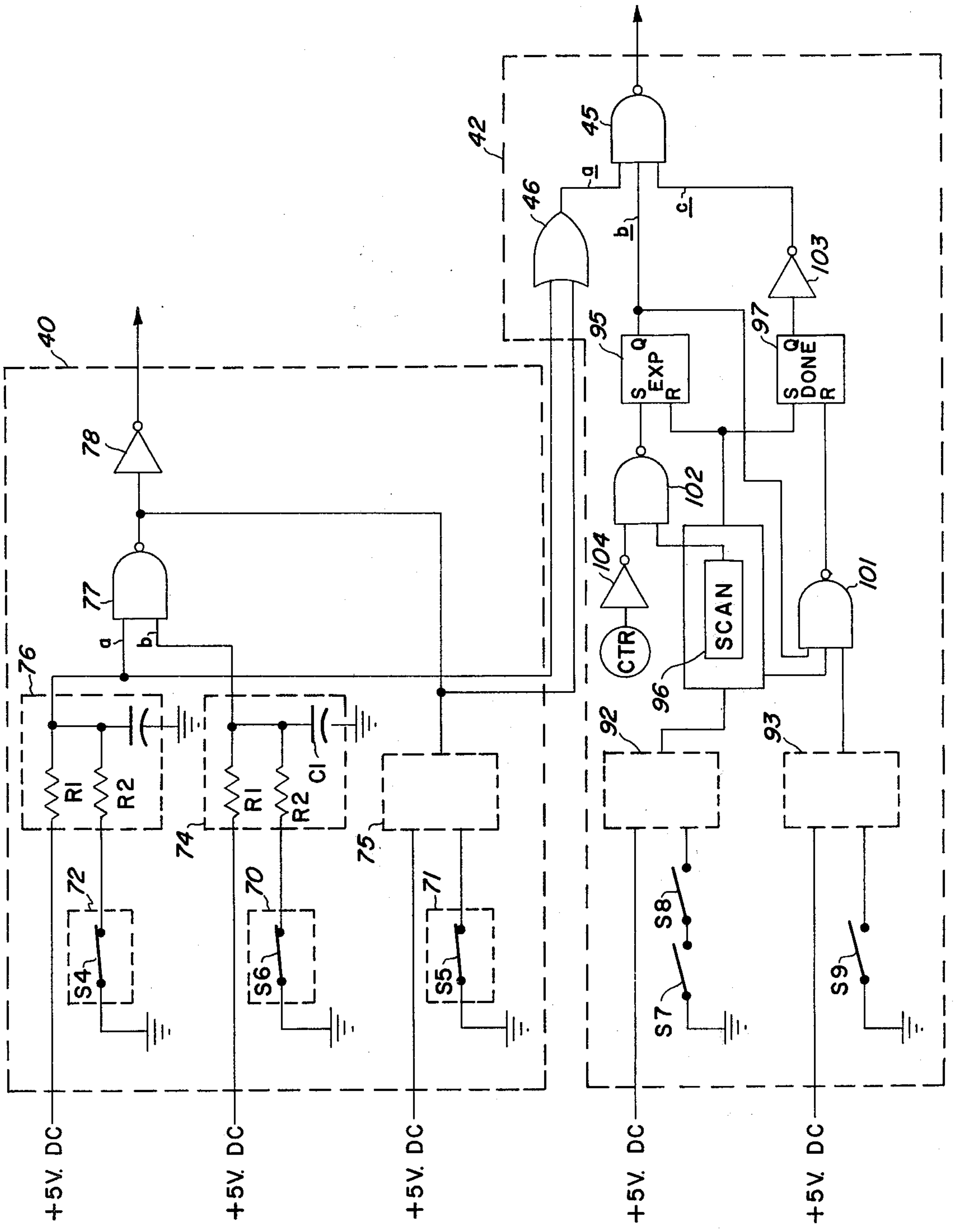
FIG. 2 shows logic means for generating count signals for the large copies that the billing apparatus shown in FIG. 1 may utilize.

FIG. 2 shows an illustrative example of logic means 40 suitable for generating the copy size indicating signal, i.e., large or small copy sheet size, and means 42 for generating pulses representing counts of the copies made in the LDC mode 40. More specifically, the paper size indicating means may comprise means 70 and 71 for sensing the presence of large and small size sheets respectively in the copy paper supply. The LDC mode sensing means 72, and the pull-up circuits 74, 75, 76 and 77, 78, of suitable design, are operatively connected to perform the functions mentioned above. In operation, the paper size sensing means 70 and 71 may comprise normally closed switches S5 and S6 in the copier/duplicator machine which are disposed in such a manner that when correspondingly sized paper supplies are in place the switches are in an open when condition while supplies have not been loaded the switches are in a closed condition. The LDC mode switch S4 is similarly connected so that it normally resides in a closed condition but opens when the machine is in LDC mode. In operation, with the switches S4, S5 and S6 closed, a ground or logical 0 signal is provided at the output of the corresponding pull-up circuits 76, 75 and 74. The pull-up circuit is of conventional design comprising resistors R1 and R2 and a capacitor. Each pull-up circuit applies a logical 0 to its output when the corresponding switches S4, S5 or S6, connecting it to a ground, is closed and changes its output to a logical 1 when the switche associated therewith is open.

As will be apparent from the following analysis of the circuit, the means 40 provides a logical 0 signal when the machine operates to make a copy on a small copy sheet (e.g., up to legal size) regardless of whether or not it is set to operate in the base mode; or LDC mode and a logical 1 signal when the machine operates in the LDC mode and large copy sheets (e.g., above legal size are loaded). Thus, referring to the means 40, when the LDC mode switch S4 and the large sheet sensing switch S6 open signifying that the machine is in LDC mode and large copy sheets are loaded then the gate 77 provides a logical 0 output which is inverted to a logical 1 output by invertor 78. Hence, more specifically, with the LDC mode and large sheet situation, there is a coincidence of logical 1 conditions at the two inputs *a* and *b* of the NAND gate 77. In turn, the NAND gate 77 provides a logical 0 output to the inverting gate 78. The gate 78 thus provides a logical 1 under these conditions. This output conditions is used to signify the presence of a large copy sheet supply. In turn, this logical 1 signal is applied to the gates 51 to 56 (FIG. 1) via the path 41 and thereby disable the gate 53. The enabling of NAND gate 56 at the *b* input thereof prepares the LDC counter C3 to receive count pulses from the sources 10 or 42 via the OR gate 48.

Conversely, a small copy sheet supply is present and a large copy sheet supply is not, the large copy sheet supply sensing switch S6, the NAND gate 77 and the inverting gate 78 respond and provide a logical 0 output. The small copy sheet sensing switch S5 senses the presence of small copy sheets and causes the pull-up circuit 75 to provide a logical 1 output. This output is inverted to logical 0 by the gate 7A logical 0 signal signifying the presence of small copy sheet is thus provided by means 40. In response to this logical 0 signal, the NAND gate 56 is disabled and the NAND gate 53 is enabled. In turn, counter C3 for the large document copies is disabled and the counters C1 and C2 for the small document copies are enabled the to receive the count pulses from the sources 10 or 42.

The copy count pulses may be provided by a suitable means 42 for LDC mode operations and applied through an OR gate 48 (FIG. 1) to the inverting gate 55. As also shown, the copy count pulses may alternatively originate from a billing count pulse generating circuit 10, of any suitable design, which may be associated with the base machine or base mode machine operations. As configured, the OR gate 48 is designed to take the copy count pulses from either of the two sources and apply them to the counters C1 and C2 or C3 via the channeling means 50.

Auxiliary copy count pulse generating means 42, as used in providing the LDC count pulses, may take the form illustrated in detail in the above-mentioned U.S. application Ser. No. 528,163, supra; Briefly generalized, the auxiliary count pulses generating means 42, as shown in FIG. 2, may be designed to comprise a NAND gate 45 which is controlled by certain conditions signifying completion of specified xerographic processing steps which take place in making a copy. The completion may be signified by an output of a coincidence gate. For example, which NAND gate 45 may be employed to provide a negative going pulse in response to a coincidence of logical 1 levels at three inputs *a, b,* and *c* , signifying the completion of a copy. The first of the three inputs goes to a logical 1 level under the control of the LDC mode switch S4 or the small size copy sheet sensing switch S5 via an OR gate 46. The second and third inputs *b* and *c* are respectively under the control of machine logic that is designed to provide a logical 1 if certain conditions or signals are present are met. Generally stated inputs *b* and *c* to the NAND gate 45 represent the status or processing stage of the copying process. When the copying process reaches a certain point which is close enough to a completion state so that it can be counted as complete, the circuit is designed to apply logical 1's to inputs *b* and *c* of the gate 45 in coincidence and enable it to output a negative going pulse. By way of example, these conditions may pertain to the actuation of certain control elements such as latches (e.g., EXP, SCAN, DONE latches) which control certain processing steps of a copying operation such as exposure and scanning. These latches are under the control of the outputs of the document original sensing means (e.g., switches S7 and S8) and the means for sensing the trailing edge of the copy sheet (e.g., switch S9), as applied via corresponding pull-up circuits 92 and 93. The inputs from a counter CRT and the switches S7 and S8 enable the exposure latch 95 and the scan latch 96 while switch S9 and the resulting outputs of the scan latch 96 and the exposure latch 95 enable the DONE latch 97 and associated decision gates 101–104 to provide the logical 1 outputs signals to inputs *b* and *c* of the NAND gate 45.

The number of copies made by the machine in the LDC mode of operation may be indicated in the form of a train of negative going impulses provided by the output of the coincidence gate 45, each pulse representing a copy made by the copier/duplicator machine. The copy count pulses from the NAND gate 45 are then selectively applied to the counters C1 and C2 via gates 48, 55 and 53 for the small copies and to the counter C3 via the gates 48, 55 and 56 for the large copies. It may be recalled that if the machine is set to copy on small sheets, whether it operates in the base or LDC mode, the size discriminating means 40 provides logical 0 signal. This signal is applied via the path 41 to the gates 51 and 56. Consequently, a logical 0 is applied to the input *b* of the NAND gate 56 and prevents it from gating the copy count pulses from the logic gate 55. The logical 0, representing small copies is inverted a logical 1 and applied to input *a* of gate 53 to enable NAND gate 53 to gate the copy count pulses from the gate 55 to the counters $C_1$ and $C_2$. Thus, each copy count pulse, in the form of a positively directed pulse, from the output of gate 55 will cause the output of NAND gate 53, when being applied to the wired OR gate 13. Each negatively directed pulse or low applied to OR gate 13 will cause, in the wellknown manner both the output and input on line 11 of this gate to be pulled low. The negatively directed pulses are inverted again by the gates 15 and 17 applied to the total billing counter C1 and the first break point counter C2 to record the cummulative counts of the copy count pulses.

An important aspect of the present billing pulse generating means 42, as used in generating copy counts for the LDC mode, is that it provides copy count pulses only when certain conditions are present, signifying that the copying operation has been properly completed. For a more detailed discussion of switchable exemplary means 42 for generating the count pulses, one may refer to the above-mentioned pending application, Ser. No. 528,163 supra.

When the machine is set to operate in the LDC mode, the logic is of a design that enables the latch 31 (FIG. 1) to control the operation of the counter C2 and this keeps the latch 31 in the set state to cause means 20 to provide a logical 1 or enabling level to AND gate 19 to enable the application of count pulses to counter $C_2$ independently of the dial setting for the programmable logic 21. This enables counter C2 to count every copy count pulse coming from the means 42 via the gates 55, 53 and 13, as the machine operates in the LDC mode and copies on the small size copy sheets. For a more detailed discussion of the operation of the programmable logic 21, the latch 31 as well as related input circuits, one may refer to the above-mentioned pending U.S. application, Ser. No. 344,321.

In summary then, in the LDC mode of operation, accompanied by the copying operation involving copy sheets up to a certain size (e.g., a regular letter or legal copy paper), the billing counter C1 counts the total count and the billing counter C2 counts each copy in the same way that they do when the machine is set to operate in the base mode. Here, however the copy count pulses are generated by the auxiliary copy count pulse generating means 42 and not from the base copy count pulse generating means 10. With the machine set in the LDC mode of operation, however and large sized paper (e.g., 18 inches × 24 inches), selected for copying, the logic for the LDC billing apparatus causes an input in the form of a logical 1 to be applied from the copy sheet size sensing means 40 through the path 41 to the inverting gate 51. The inverting gate 51 in turn applies a logical 0 to the input *a* of the NAND gate 53 and disables it. This prevents the gate 53 from passing or gating the copy count pulses from the inverting gate to the counters $C_1$ and $C_2$. However, this NAND gate 56 is enabled by the logical 1 input and passes the copy count pulses from the inverting gate 55. This represents the copy counts of the large sized copy sheets made. The output of the inverting gate 57 is then applied to the separate billing counter C3.

When the machine is set to operate in the LDC mode to copy large sized copies, the paper size sensing means 40 provides a logical 1 output. Under these output conditions, copy count pulses from gate 45 are applied to the LDC billing counter C3 via gates 56 and 57 while the total copy counter C1 and the first break point copy counter C2 are disabled due to the disabled condition of NAND gate 53.

In accordance with another aspect of the present invention, the billing apparatus may further include a suitable means 60 to provide independent count indicia for a plurality of separate users. The machine of the present design may be leased to a number of parties at a building or other user location. The lessees may want to share the cost of leasing the machine in a manner proportionate to the amount of their use. One way of keeping track of the proportion of use may be accomplished by utilizing a counter similar to that disclosed in the U.S. Pat. No. 3,436,530, issued to Rudolf Faude, et al. Such a counter takes the form of a portable plug-in key counter unit C4 which is issued to the authorized lessees. Where the machine is to be shared by a number of different parties as above, it is provided with a suitable mechanism 59 having a socket to receive the key counter C4. The mechanism 59 is of a design that prevents actuation of the machine unless the key counter C4 is plugged in. Thus, in addition to the counting function, the key counter acts as a key to the machine. Thus, in practice, suppose customers A and B wish to use the same machine and share the cost. They may be provided with plugable key counter units No. 1 and No. 2, respectively. When customer A plugs in key counter No. 1 to the socket in the machine, he unlocks the machine and enables the machine to operate. The counter C4 of the unit No. 1 records the counts of the copies made may, in similar manner, the customer B having another unit (No. 2) likewise plug his counter unit into the socket to unlock the machine and operate it. He would obtain his copy counts in another counter unit No. 2.

In order to accommodate the above operational features of the machine, the counting apparatus according to the present invention as depicted in FIG. 1, is provided with an OR gate 54, whose inputs are inverted, which is connected to receive the count pulses representing either small copies from the OR gate 13 or the NAND gate 53 as well as the count pulses representing the large sized copies from the gate 56. These pulses are gated through the counter unit No. 1 or No. 2 to the corresponding counters C4 and C5, depending on which unit is engaged. The billing may then be apportioned among the parties having access to the machine based on the readings of the counters in position C4. As evident from above, unlike billing meters C1, C2 and C3, the billing meter in position C4, associated with the keyed counter units do not discriminate as to the size of the copies made.

While the present invention is described within the environment of a xerographic copier/duplicator machine, it is to be understood that the basic principles of the present invention need not be so limited. It may just as well be used in non-xerographic machines such as photostatic or other types of copying machines using specially treated for making copies which have a similar requirement for require counting apparatus that provides separate records on different counters to keep track of the number of items copied, produced, duplicated or processed according to established criteria such as size, shape, weight or any other suitable parameter. Accordingly, various changes and modifications may be made to the present invention from the illustrative embodiments described hereinabove without departing from the spirit and scope thereof.

What is claimed is:

1. Counting apparatus for automatic reproducing equipment operable in a first mode for making copies up to a first size, and in a second mode for making copies up to a second size, said second size being larger than said first size, said apparatus comprising:

first pulse means for generating count pulses representing copies made in said first mode;

first counting means;

first enabling means for enabling said first counting means to record cummulatively the total copy count pulses from said first pulse means;

second pulse means for generating second copy count pulses representing copies made in said second mode;

second counting means;

logical signal generating means responsive to equipment operation in said second mode for sensing the size of copies made, said logical signal generating means generating a logical signal of one state upon a sensing the copies made are up to said first size, and a logical signal of another state upon a sensing the copies made are of a size larger than said first size up to said second size; and means responsive to said logical signal of one state for enabling said first counting means for recording cummulatively the copy count pulses from said second pulse means or responsive to said logical signal of another state for enabling said second counting means for recording cummulatively the copy count pulses from said second pulse means.

2. Counting apparatus for automatic reproducing equipment operable in a first mode for making copies up to a first size and in a second mode for making copies up to a second size, said second size being larger than said first size, said apparatus comprising:

first pulse means for generating first count pulses representing copies made in said first mode;

first counting means;

second counting means;

first enabling means for enabling said first counting means to record cummulatively the total copy count pulses from said first pulse means;

second enabling means for enabling said second counting means to record cummulatively copy count pulses from said first pulse means up to a first break point;

second pulse means for generating second copy count pulses representing copies made in said second mode;

logical signal generating means responsive to equipment operation in said second mode for sensing the size of copies made, said logical signal generating means generating a logical signal of one state upon a sensing that copies made are up to said first size, and a logical signal of another state upon a sensing that copies made are of a size larger than said first size up to said second size;

means responsive to said logical signal of one state to enable said first counting means for recording cummulatively the total copy count pulses from said second pulse means;

means responsive to said logical signal of one state to enable said second counting means for recording cummulatively copy count pulses from said second pulse means up to said first break point;

third counting means; and means responsive to said logical signal of another state for enabling said third counting means for recording cummulatively the copy count pulses from said second pulse means.

3. The apparatus according to claim 2 wherein said logical signal generating means includes:

first sensing means for sensing the mode of operation of said equipment in said second mode and generating a second mode indication in response thereto;

second sensing means for sensing copy sheet size up to a first size and generating a first size copy sheet indication in response thereto, third sensing means for sensing copy sheet size of a second size, larger than said first size copy sheet and generating a second size copy sheet indication in response thereto; and logic means responsive to said second mode indication and said first size copy sheet indication for generating a logical signal of said one state and responsive to said second mode indication and said second size copy sheet indication for generating said logical signal of said another state.

4. The apparatus according to claim 3, wherein said second copy count pulse generating means includes:

means for sensing the trailing edge of the document original and generating a document original trailing edge signal;

means responsive to the completion of copying steps for generating a copying step completion signal; and additional logic means responsive to said document original trailing edge signal and said copying step completion signal for generating an output count pulse indicative of the completion of a copy.

5. The apparatus according to claim 4 wherein said second copy count pulse generating means additionally comprises means for sensing the trailing edge of a copy sheet and generating a copy sheet trailing edge signal, said additional logic means, further responsive to said copy sheet trailing edge signal and said copying step completion signal for generating an output count pulse indicative of completion of a copy.

6. The apparatus for automatic reproducing equipment according to claim 2 wherein said equipment includes document original feeding means and scanning means and is operative in said first mode to move said scanning means past the document original and is operative in said second mode to hold said scanning means in a stationary position and engage said document original feeding means to cause a feeding of a document original past said stationary scanning means.

7. The apparatus according to claim 6, wherein said scanning means and said document original feeding means are adapted to handle document originals of different sizes and copy sheets of said first and said second sizes.

8. Counting apparatus for automatic reproducing equipment capable of selectively reproducing copies on copy sheet up to a first size or up to a second size larger than said first size, said automatic reproducing equipment being adapted to make copies on copy sheets up to said first size in a base mode and for making copies up to said second size in an auxiliary mode, said counting apparatus comprising:

means for generating count pulses representing the copies made up to said first or said second sizes, said count pulse generating means including first means for generating pulses representing copies made in said first size while said equipment operates in its base mode and second means for generating other pulses representing copies of either size made while said equipment operates in its auxiliary mode;

first counting means for cummulatively recording said copy count pulses of the copies made up to said first size;

second counting means for cummulatively recording said copy count pulses of the copies made larger than said first size up to said second size;

means for providing a logical signal of a first state for a copy sheet up to said first size and a logical signal of a second state for a copy sheet larger than said first size up to said second size;

means responsive to said logical signal of a first state for channeling count pulses from said second count pulse generating means to said first counting means, and responsive to said logical signal of a second state for channeling count pulses from said second count pulse generating means to said second counting means;

third counting means; and means for applying said count pulses to said third counting means up to a predetermined break point when said equipment operates in the base mode.

9. The apparatus according to claim 8 additionally comprising:

outlet means for providing count pulses representing copies made up to said first or second size;

portable counting means connectable to said outlet means for counting the count pulses provided thereat; and means for applying the count pulses from said first and second means for generating to said portable counting means through said outlet means.

* * * * *